United States Patent [19]

Chaudon et al.

[11] Patent Number: 4,834,916
[45] Date of Patent: May 30, 1989

[54] APPARATUS FOR THE DRY STORAGE OF HEAT-EMITTING RADIOACTIVE MATERIALS

[75] Inventors: Luc Chaudon, St Paul Trois Chateaux; Michel Dobremelle, St Arnoult en Yvelines; Jean-Claude Fabre, Pont St Esprit; Jean Geffroy, Versailles, all of France

[73] Assignee: Commissariat a l'Energie Atomique, Paris, France

[21] Appl. No.: 72,930

[22] Filed: Jul. 14, 1987

[30] Foreign Application Priority Data

Jul. 17, 1986 [FR] France ............... 86 10409

[51] Int. Cl.⁴ .................. G21F 9/12; G21F 9/24; G21F 5/00; G21C 19/00
[52] U.S. Cl. .................. 252/633; 250/506.1; 250/507.1; 252/644; 376/261; 376/272
[58] Field of Search ............ 376/261, 272, 287, 293, 376/295, 310, 313; 252/633, 626; 250/506.1, 507.1; 422/71, 903

[56] References Cited

U.S. PATENT DOCUMENTS

| | | |
|---|---|---|
| 3,046,403 | 7/1962 | Montgomery ............ 250/506.1 |
| 3,230,373 | 1/1966 | Montgomery ............ 250/506.1 |
| 4,277,361 | 7/1981 | Szulinski ............... 252/633 |
| 4,299,659 | 11/1981 | Hame et al. ............. 376/272 |
| 4,366,114 | 12/1982 | Kuhnel et al. ........... 376/272 |
| 4,459,260 | 7/1984 | Bradley ................ 376/272 |
| 4,525,324 | 6/1985 | Spilker et al. ........... 376/272 |
| 4,527,066 | 7/1985 | Dyck et al. ............ 250/507.1 |
| 4,527,067 | 7/1985 | Dyck et al. ............ 250/507.1 |
| 4,527,068 | 7/1985 | Dyck et al. ............ 250/507.1 |
| 4,532,428 | 7/1985 | Dyck et al. ............ 250/507.1 |
| 4,713,199 | 12/1987 | Spilker et al. ........... 252/633 |

FOREIGN PATENT DOCUMENTS

| | | |
|---|---|---|
| 0061819 | 10/1982 | European Pat. Off. . |
| 2711405 | 9/1978 | Fed. Rep. of Germany . |
| 2730729 | 1/1979 | Fed. Rep. of Germany . |
| 2046162 | 1/1980 | United Kingdom . |

*Primary Examiner*—Howard J. Locker
*Attorney, Agent, or Firm*—James E. Nilles; Thomas F. Kirby

[57] ABSTRACT

Apparatus is disclosed for the dry storage of heat-emitting radioactive waste materials. The latter are stored in tubes placed within a room having at least one cold air inlet and a hot air outlet. The distance between adjacent tubes and the distance between a tube and a wall of the room is such that a conically-shaped hot air boundary layer formed by natural convection around a tube is in contact neither with the boundary layer of another tube, nor with the wall of the room.

12 Claims, 6 Drawing Sheets

APPARATUS FOR THE DRY STORAGE OF HEAT-EMITTING RADIOACTIVE MATERIALS

BACKGROUND OF THE INVENTION

The present invention relates to an apparatus for the dry storage of heat-emitting materials, more particularly usable for storing radioactive materials.

It applies to all types of irradiated fuels or to certain categories of nuclear waste. It more particularly relates to fuels from experimental nuclear reactors produced in limited numbers or having a low content of recoverable fissile materials, non-standard fuels, various waste materials, such as the residues of cans or fission products for which reprocessing or final storage are not yet possible.

The solution used for the control of these objects is long term intermediate storage (several dozen years), after which a final processing will take place.

For storing heat-emitting irradiated materials, three main conditions must be fulfilled:

the confinement of radioactive materials preventing the contamination of the environment;

biological protection preventing irradiation of working personnel and of the environment;

thermal cooling ensuring an acceptable temperature level for a good preservation of the materials and the structures in which they are stored.

At present there are two main methods for the provisional storage of irradiated nuclear fuels, namely storage under water, which is the solution generally adopted on an industrial scale, and dry storage.

When stored under water, the irradiated fuels are immersed in the water of a tank. This water is permanently decontaminated by passage over purifying devices, such as filters or ion exchange resins. It is also permanently cooled by passage through a heat exchanger. Under these conditions the water ensures three main functions. Firstly it participates in the confinement by retaining the radioactive substances which have been able to escape from the fuels. It also provides a biological protection by stopping radiation, five to six meters of water providing an effective protection against most radiation. Finally, the water ensures the cooling of the waste by serving as a heat transfer agent which, during the passage through the exchanger, gives up the thermal energy emitted by the fuels.

This type of installation is used for receiving fuels resulting from the operation of reactors. This is the case with discharge or storage ponds, which fulfil a buffer function on entering fuel reprocessing plants. These installations produce high volumes of effluents, requiring significant capital expenditure and involving high operating costs.

In the other type of storage, i.e. dry storage, three main methods are used, namely storage in a flask, storage in a silo and storage in a cave.

In the case of flask storage, the fuels are placed in a cavity with metal walls surrounded by a system formed from different materials ensuring the biological protection. In this case, cooling takes place by conduction and radiation between the fuel and the metal wall serving as a confinement barrier and by convection and radiation between the confinement barrier and the environment.

In the case of silo storage, it is possible to use either buried silos, or surface silos. The fuel is placed in a confinement enclosure (generally constituted by a metal container with a welded cover) and is then placed in a generally concrete silo. The spacing between the silos is determined by local conditions. In the case of a buried silo, the heat transfer between the fuel and the confinement barrier takes place by conduction and radiation, whilst the heat transfer between the confinement barrier and the environment takes place by conduction. In the case of a surface silo, the heat transfer between the fuel and the confinement barrier takes place by conduction and radiation, whilst the heat transfer between the confinement barrier and the environment takes place by natural convection and by radiation.

In the case of cave storage, the waste is placed within vertical tubes, which are themselves distributed within a room closed or sealed by a biological protection barrier, e.g. a concrete wall. The lower part of the tubes are sealed and the upper part open, the irradiated fuel being introduced into the tubes by means of a transfer machine making it possible to pass the products to be stored through orifices appropriately arranged within the biological protection barrier. These orifices are located in the upper wall of the room and give access to the interior of the tubes from a handling area positioned above the room. The heat emitted by the fuel is evacuated by convection, generally by a circulation of air, which can be forced or natural.

In such an apparatus, cold air generally arrives in the lower part of the room, whilst hot air extraction takes place either in the upper part thereof, or in a side wall. Such an apparatus suffers from the deficiency that the air coming into contact with one of the tubes or shafts may already have been reheated on contact with another tube or shaft, which makes cooling relatively ineffective, or non-existent for certain tubes. This limits the storage capacity of certain rooms, or requires the presence of fans or other means ensuring a forced ventilation of the room, which makes such installations more complex and therefore more costly.

SUMMARY OF THE INVENTION

The problem of the present invention is to obviate these disadvantages by proposing an apparatus for the dry storage of heat-emitting materials making it possible to effectively cool them by natural convection.

To this end, the invention proposes an apparatus for the dry storage of heat-emitting materials comprising, in known manner, at least one tube within which the materials are stored, the walls of the tube heating under the effect of the heat emitted by these materials and leading to the formation, by natural convection, of a limiting layer or boundary layer of a heat transfer fluid, the tube being placed within a room defined by a wall having at least one cold fluid inlet in its lower part and a hot fluid outlet in its upper part. According to the invention, the distance between the tube and the wall of the room or between the tube and an adjacent tube is such that the limiting layer or boundary layer is in contact neither with the wall of the room, nor with the limiting layer of an adjacent tube, the cooling of each tube thus being independently ensured.

The most frequently used heat transfer fluid is air, but it would not pass beyond the scope of the invention to use another fluid, such as e.g. another gas. The expression "cold fluid" designates the fluid which enters the room through the cold fluid inlet and which is at a certain temperature (e.g. the external ambient temperature in the case of air), whilst the expression "hot fluid" designates the fluid which has been heated on contact with the tube and which is therefore at a temperature above that which it had when it entered the room. The expression "limiting layer" designates the hot air layer which naturally forms around each tube due to the heat emitted by the materials stored in it.

Thus, each tube is cooled by the cold fluid which enters the room, the fluid heating on contact with the walls of the tube and rising along the same. Thus, a hot air layer is formed in the upper part of the room, said hot air being discharged by the hot air outlet provided in the upper part thereof. The limiting layer surrounding a tube is not in contact either with the side walls of the room, or with the limiting layer of another tube, each tube being solely cooled by the cold fluid which has entered the room and not by the fluid which has already been in contact with another tube and has therefore already been heated. Thus, cooling can take place by natural convection without it being necessary to provide fans or other means for obtaining a forced circulation of the fluid.

According to another aspect of the invention, the arrangement of the materials stored in the tubes is such that no material is located in the upper part of the tube. Thus, in view of the fact that the fluid used for cooling the tubes rises along the latter, a hot air layer is formed in the upper part of the room. Thus, the air circulating in the direction of the fluid extraction orifice is in contact with several consecutive tubes. However, since on contact therewith, it passes into a zone where there are no stored products, it is subject to no further heating and consequently does not prejudice the cooling of the tubes.

The upper part of the storage room is sealed by an upper slab, which can be made from concrete and constitutes a biological protection barrier. This slab has an upper face forming the floor of the handling area and a lower face which forms the ceiling of the storage room. This lower face can be horizontal or, in a constructional variant, inclined by a certain angle with respect to a horizontal plane and arranged so as to rise on approaching the outlet orifice. This arrangement aids the discharge of hot air towards the outlet. It is also possible to use a deflector, i.e. a flat panel inclined in the same way and made from a material able to resist the temperatures reached in the storage room.

According to another aspect of the invention, the hot fluid outlet is connected to an extraction pipe equipped with a standby branch or bypass circuit. The presence of such a circuit is particularly useful in the case of storing radioactive products, when one or more tubes suffer from leaks. In the preferred embodiment, the standby branch circuit comprises:

a duct connected in parallel to the extraction pipe and connected therewith by an inlet port and an outlet port, a very efficient filter mounted on said duct so as to filter the fluid circulating in the latter, means for sealing the extraction pipe between the inlet port and the outlet port, a radioactivity detector in the extraction pipe, and control means connecting said detector to the sealing means.

Preferably, the duct is provided with an extractor fan, whereby the latter can be connected to the radioactivity detector by control means. Thus, if radioactivity has been detected in the fluid extracted by the extraction pipe, the probe controls the sealing of the latter and the fluid passes through the duct, where it is filtered by the very efficient filter. Thus, radioactivity-free fluid or air is discharged to the outside.

BRIEF DESCRIPTION OF THE DRAWINGS

The invention is described in greater detail hereinafte relative to non-limitative embodiments and the attached drawings, wherein show.

DETAILED DESCRIPTION OF THE PREFERRED EMBODIMENTS

Figure 1:
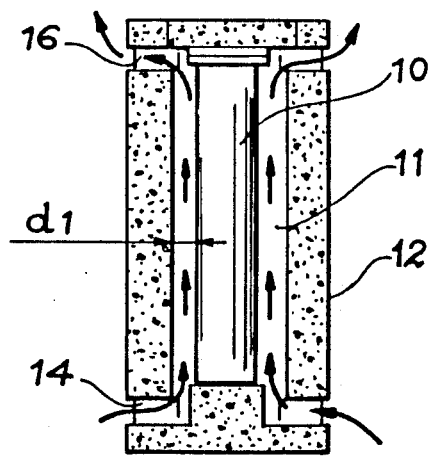
FIG. 1: A diagrammatic vertical sectional view of an apparatus according to the invention with a single tube.

FIG. 1 illustrates the principle of the invention in the case of an elementary module only having a single tube. In this case, tube 10 is in the form of a metal cylinder having a vertically disposed axis, within which is placed radioactive waste giving off heat. Tube 10 is surrounded by a biological protection wall 12, which is generally of concrete. In the lower part of the wall there is at least one cold fluid inlet port 14 (in most cases said fluid being air) and in its upper part has at least one hot fluid extraction port 16.

As the materials stored in tube 10 emit heat, this has the effect of heating the walls of the tube. The air in contact therewith outside the tube is also heated, rises along the tube and leaves the room by the hot air extraction port or ports 16. This calls in air into the lower part of the room and a further cold air quantity enters through port 14. Thus, there is an air flow from the bottom to the top from inlet port 14 to outlet port 16.

The air which heats in contact with the wall of tube 10 and rises along the latter constitutes a hot air layer, called the "limiting layer" or "boundary layer" in the present description, whose thickness increases as the air rises along the tube and as will be shown hereinafter. According to the invention, the distance $d_1$ between the wall of the tube and the side wall 12 defining the room is such that the limiting layer is not in contact with wall 12, in order to facilitate the hot air flow and have a better cooling efficiency.

Figure 2:
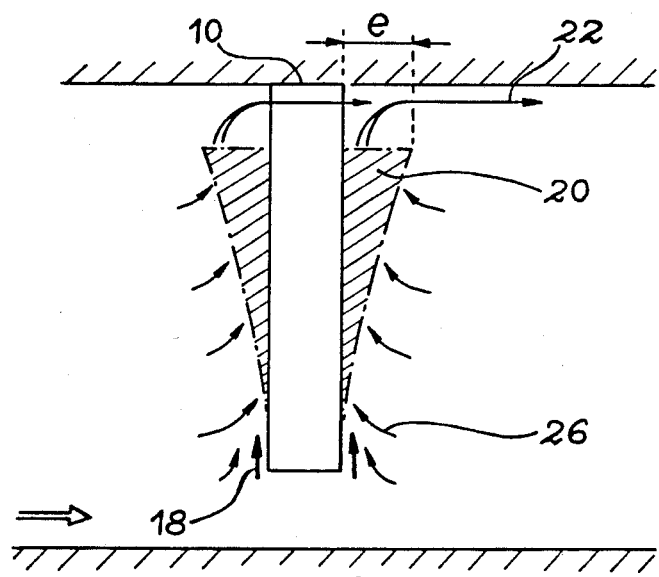
FIG. 2: A diagram illustrating the formation of an air limiting layer or boundary layer around a tube.

The cooling mechanism for tube 10 is illustrated in the diagram of FIG. 2. The latter shows storage tube 10 in the vertical position, the cold air entering the lower part thereof being symbolized by arrows 18. The air heating in contact with the walls of the tube 10 rises along the latter and a rising hot air flow is formed, which is called the "limiting layer" or "boundary layer" 20 and which is shown in the hatched area of FIG. 2.

This layer has a very limited and almost zero thickness in the lower part of the tube and rises regularly as the air rises along the tube walls and then reaches a limit value e. When it has arrived in the upper part of the tube, the air has reached its maximum temperature and moves away from the tube towards the air extraction orifices, as symbolized by arrows 22. Moreover, the fact that the air circulates from bottom to top in contact with the tube wall brings about a call to the surrounding air, symbolized by arrows 26 and said air supplies the limiting layer.

Figure 3:
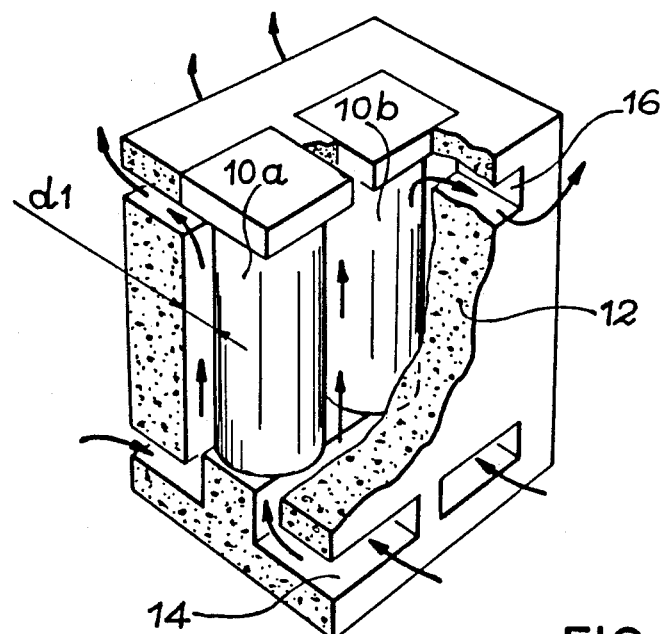
FIG. 3: A diagrammatic perspective view, partly exploded, of an apparatus according to the invention with two storage tubes.

According to the invention, the distance between the outer wall of a tube 10 and the wall 12 of the room is at least equal to e, so that the flow of air is not disturbed by the presence of wall 12, as stated hereinbefore. Moreover, in the case where the apparatus has several tubes (such as e.g. tubes 10a and 10b in FIG. 3), the distance between the tubes is equal to or exceeds 2e, so that the limiting layer 20 of a given tube is not in contact with the limiting layer of the adjacent tube. Thus, each tube is cooled independently of the adjacent tubes and solely by the cold air arriving in the lower part of the room. This makes it possible to have a room which is as large as required as a function of the number of tubes necessary for storage purposes, the cooling being provided by natural convection, no matter what the dimensions of the room. The determination of the shape and dimensions of the limiting layer is based on the use of the general equations of fluid mechanics applied to natural convection.

Thus, it is possible to determine as a function of the shape and dimensions of the tubes, the nature of their constituent material and the heating power of the materials stored, the distance between a tube and the walls of the room or the distance between a tube and the adjacent tubes. The dimensions of the room are consequently a function of the number of tubes necessary and the minimum distance between two adjacent tubes or between one tube and the biological protection wall. If it is necessary to increase the storage capacity, it is possible to enlarge the room for housing further tubes. No matter what the dimensions of the room and the number of tubes, cooling still takes place in the same way by natural convection, each tube being independently cooled.

Figure 4:
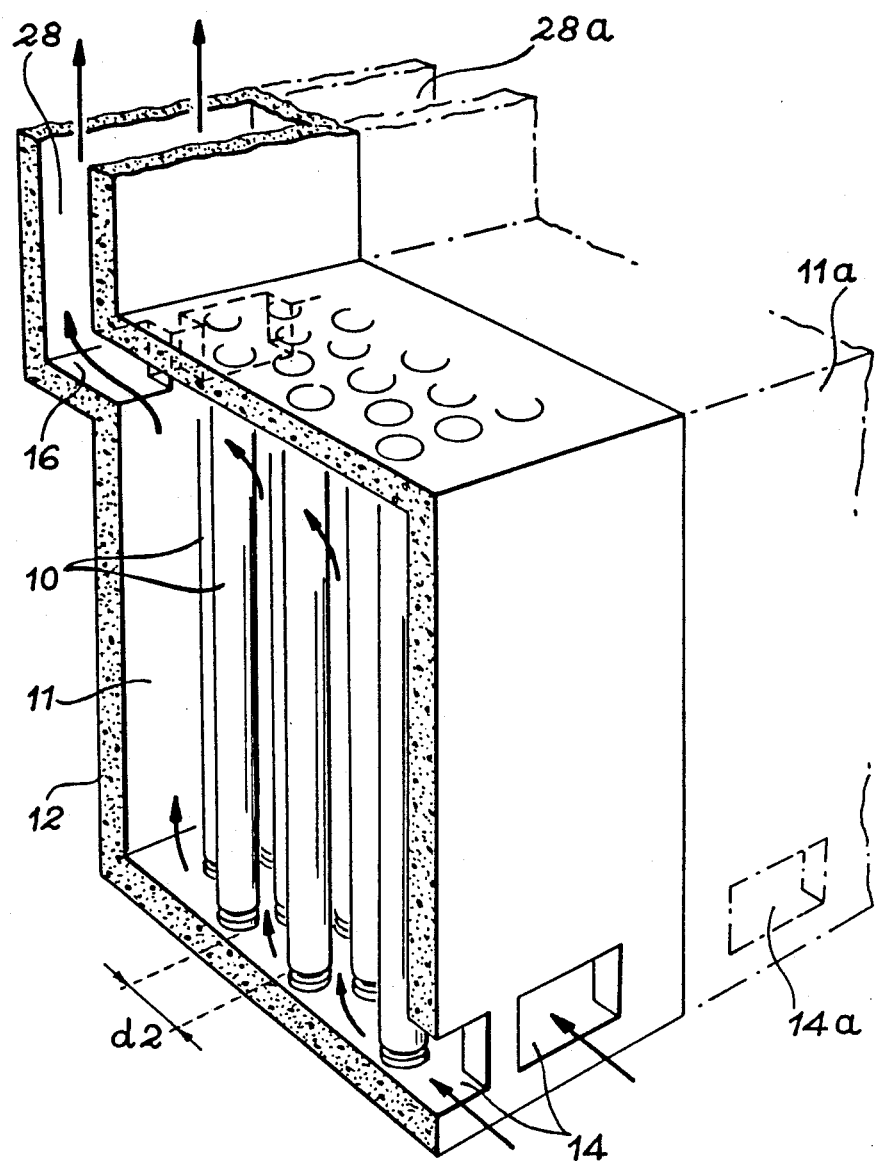
FIG. 4: A diagrammatic perspective, sectional view of an apparatus according to the invention containing a random number of tubes and showing how the storage room can be enlarged.

This is illustrated in FIG. 4, where it is possible to see a room 11 defined by a wall 12 and containing a large number of tubes 10. In the particular case illustrated in FIG. 4, the tubes are arranged in staggered manner, but it would not pass outside the scope of the invention to use another arrangement (e.g. square or rectangular spacing), provided that the distance of spacing conditions are respected. In the apparatus shown in continuous line form in FIG. 4, it is possible to see several air inlets 14 in the lower part of room 11 and several hot air extraction ports 16 in the upper part of the room, ports 16 being linked with an extraction pipe 28. If it is necessary to increase the storage capacity of the apparatus, it is possible to construct on the side of room 11, another room 11a diagrammatically represented in mixed line form and having in its lower part at least one cold air inlet 14a and in its upper part at least one air extraction port (not shown) connected to an extraction pipe 28a. As a function of the particular case, room 11a can be constructed on the side of room 11 and separated therefrom by a concrete wall, or can constitute an extension thereof, the extraction pipes 28, 28a only forming a single pipe.

Figure 8:
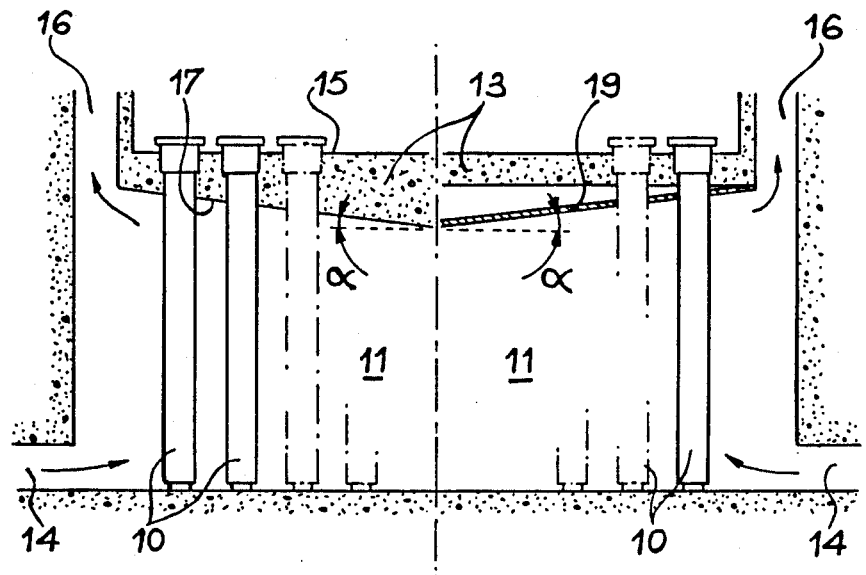
FIG. 8: A diagrammatic vertical sectional view showing how the ceiling of the storage room can be inclined or equipped with a deflector.

In the case of FIG. 4, the ceiling of the storage room 11 is flat and horizontal. However, it can be inclined, as illustrated in FIG. 8. The left-hand part of the latter corresponds to the case where the lower face of the upper slab is inclined and the right-hand part to the case where a deflector is used.

In the left-hand part of FIG. 8, it is possible to see slab 13 having an upper face 15 and a lower face 17 constituting the ceiling of the storage room 11. Face 15 is flat and horizontal, but the slab thickness decreases on approaching outlet port 16, so that the ceiling 17 forms an angle with the horizontal and progressively rises towards the outlet port 16.

In the right-hand part of FIG. 8, the two faces of slab 13 are planar and horizontal and the latter has a constant thickness. However, there is a deflector 19, which is flat and forms an angle $\alpha$ with the horizontal and progressively rises in the direction of outlet port 16. Deflector 19 is made from a material able to resist the temperatures reached in the upper part of the storage room.

In both cases, this arrangement assists the discharge of hot air in the direction of outlet port 16. Angle $\alpha$ is determined as a function of the thermal and thermodynamic conditions of each storage room.

Figure 5:
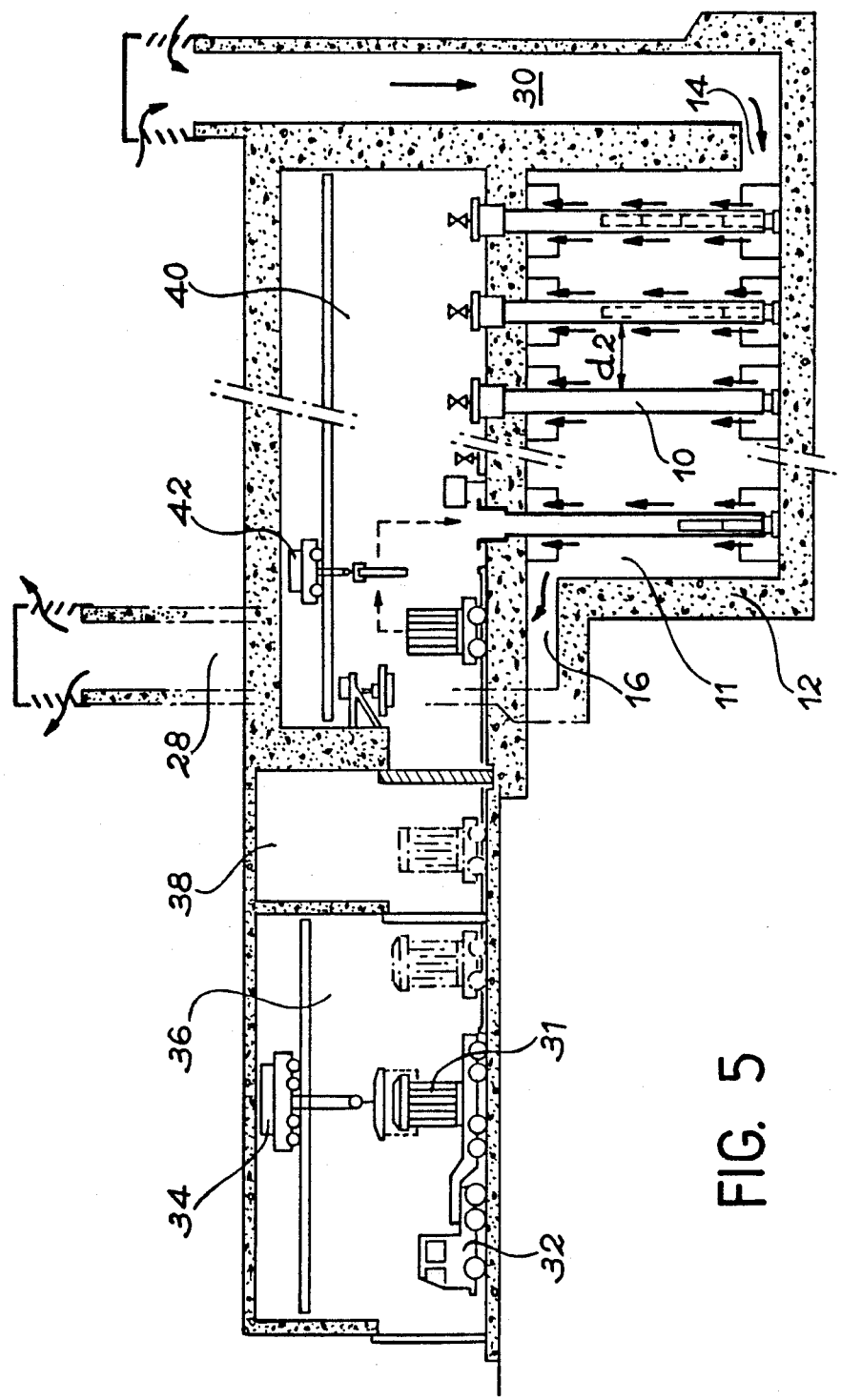
FIG. 5: A diagrammatic vertical sectional view of a storage installation incorporating an apparatus according to the invention.

The vertical sectional view of FIG. 5 diagrammatically illustrates the complete storage installation. It is possible to see the room 11, within which are placed the storage tubes 10, said room being defined by a biological protection wall 12. Cold air enters room 11 by one or more cold air inlet ports 14 located in the lower port. In the particular case illustrated in FIG. 5, port 14 is connected to the outside by a cold air supply shaft 30. Thus, the air enters the lower part of the room 11, rises vertically along tubes 10, whilst heating and leaves room 11 through outlet port 16, which is connected to a hot air extraction pipe 28.

The waste to be stored in the apparatus according to the invention is supplied to the storage installation in a flask 31 transported by a vehicle 32. A travelling crane 34, placed in the reception area 36 is used for discharging flask 31. The latter is then transported into a lock 38 and from there into the handling area 40 above room 11. Another travelling crane 42 takes up the radioactive materials contained in the flask (e.g. irradiated fuels in containers) and deposits them within tubes 10, after removing the plugs sealing the upper part of the latter.

Figure 6:
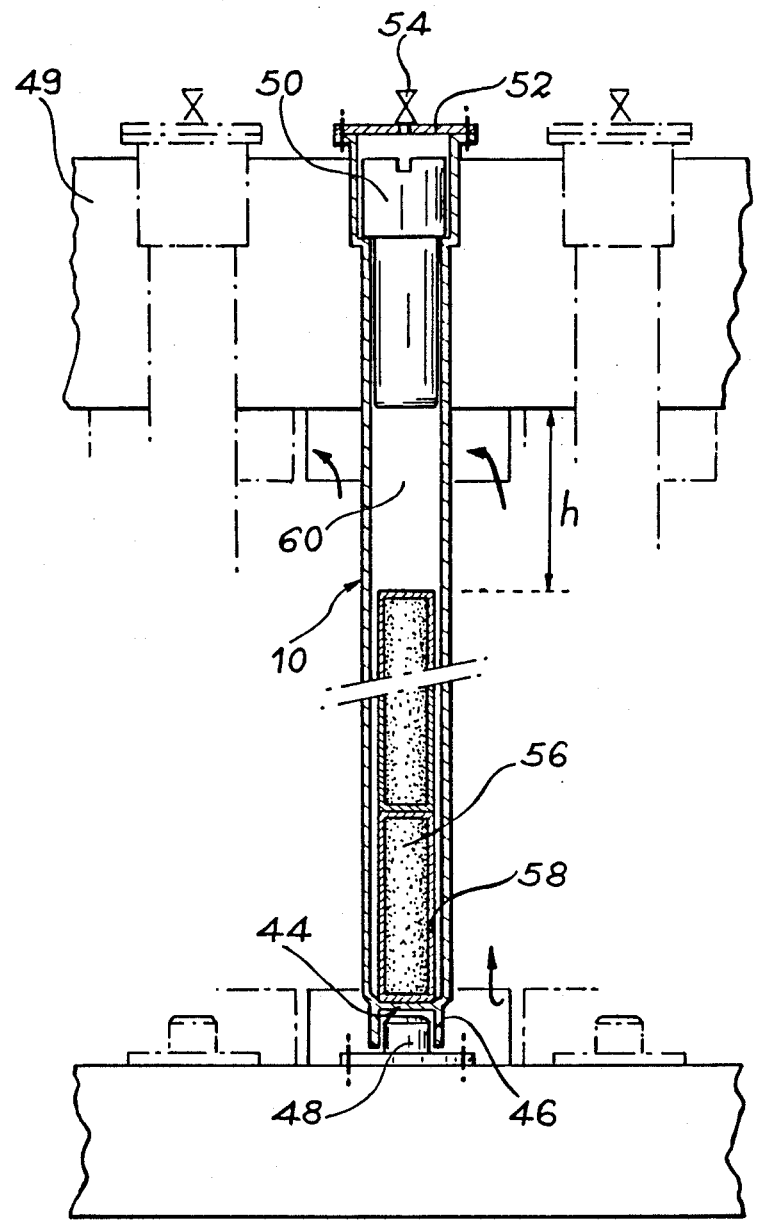
FIG. 6: A diagrammatic, larger scale, sectional view of a tube used in the invention.

The construction of the tubes 10 and their sealing means can best be gathered from the sectional view of FIG. 6. The latter shows that each tube 10 is formed from a cylindrical tubular member sealed in its lower part by a base 44. The latter is extended by a ring 46, which surrounds a support 48 sealed to the floor. The function of the ring is to maintain the radial positioning of the tube, particularly in the case of an earthquake, whilst still permitting a vertical displacement due to the expansion of the tube. For this purpose, ring 46, which is generally joined to the base 44 of tube 10 has dimensions such that it does not touch the floor of the storage room or support 48.

Obviously, it would not fall outside the scope of the invention to replace ring 46 by any equivalent system, e.g. several centring pins surrounding support 48.

Figure 9:
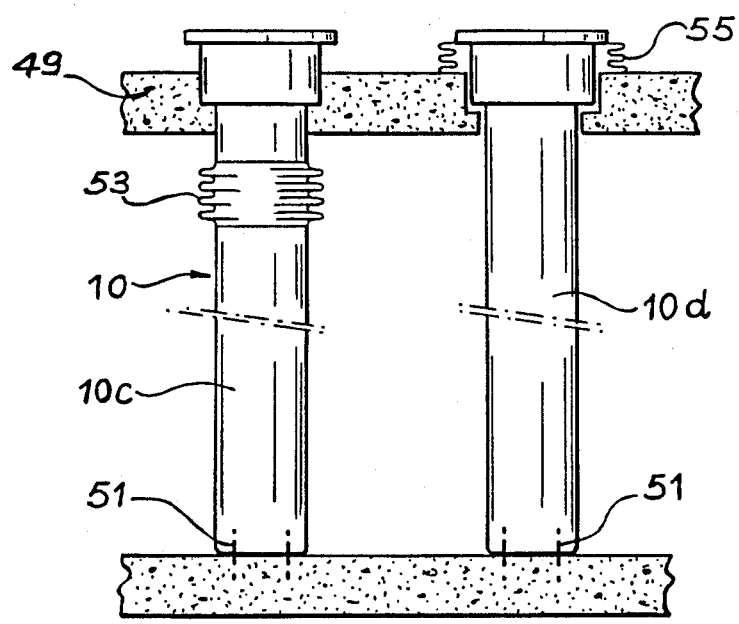
FIG. 9: A diagrammatic elevation illustrating another possible arrangement for the storage tube.

FIG. 9 illustrates a variant in which the tubes 10 are fixed in their lower part to the floor of the storage room, as indicated at 51. As will be explained hereinafter, the upper part of the tubes 10 passes through the upper slab 49, so that they are accessible from the handling area. In this variant, bellows permit the expansion in the vertical direction. In the left-hand part of the drawing, a portion of the tube 10c to the left of the drawing is in the form of a bellows 53, whilst tube 10d to the right of the drawing rests on the upper face of slab 49 via a bellows 55. In both cases, the tubes 10 are free to move with respect to slab 49.

The upper part of tube 10 is within a concrete slab 49 and a plug 50, whose height is substantially equal to the thickness of slab 49, ensures the biological confinement of the upper part of the tube 10 (FIG. 6). The latter is sealed, above plug 50, by a cover 52 equipped with a sampling valve 54.

The waste 56 (e.g. irradiated fuel) is placed within a container or can 58. In order to introduce the waste into tube 10 from the handling area 40, the first operation involves removing cover 52 and then plug 50 and then the containers 58 are individually introduced into tube 10 with the aid of the traveling crane 42 (FIG. 5).

FIG. 6 shows that the containers 58 do not occupy all the height of tube 10, which leaves a free space 60, i.e. which does not contain waste, within the upper part thereof. As indicated hereinbefore, the height h of part 60 is determined in such a way that it is substantially equal to the thickness of the hot air layer forming in the upper part of the room. Thus, the air which comes into contact with the upper part 60 of a tube 10 can be already heated air, but this is not prejudicial because it is not necessary to cool this part of the tube.

In the case of dangerous or radioactive products, confinement is ensured by a double barrier firstly constituted by can 58 and then by the walls of tube 10. However, leaks may occur in the wall of a can 58 and in the least favourable case also in the wall of tube 10, which would risk contaminating the cooling air. The sampling valve 54 on the cover 52 of tube 10 by regular checks makes it possible to determine whether the atmosphere within the tube is contaminated and consequently if there is a leak in one of the stored cans or containers. However, in the case where tube 10 has a leak, which would risk contaminating the cooling air, a standby or emergency branch or bypass circuit is provided on the extraction pipe 28, as illustrated in FIG. 7.

Figure 7:
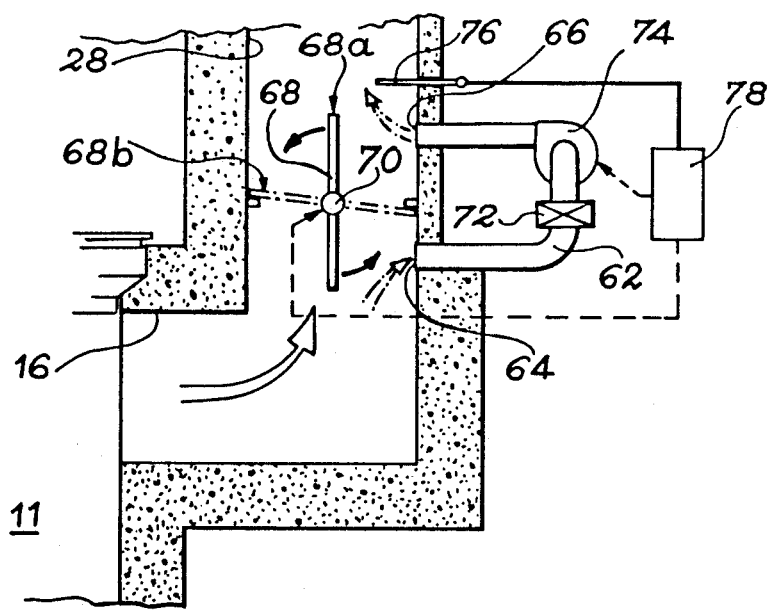
FIG. 7: A diagrammatic vertical sectional view illustrating the standby branch circuit equipping the air extraction pipe.

It is possible to see in FIG. 7 the hot air extraction port 16 in the upper part of room 11 and the extraction pipe or shaft 28. Connected in parallel on pipe 28 is provided a duct 62 communicating with the latter by an inlet port 64 and an outlet port 66. The latter is positioned downstream of port 64 with respect to the air flow direction in pipe 28. Moreover, a sealing flap 68 is mounted within pipe 28 and can seal the latter between ports 64 and 66 of duct 62. In the particular case described here, flap 68 is in the form of a panel, which can pivot about a pin or spindle 70 and moves between an open position 68a, shown in continuous line form, and a closed position 68b, shown in mixed line form. In the closed position, it prevents air from escaping directly through the extraction pipe 28.

A very efficient filter 72 is mounted on duct 62, so as to filter the air passing through said duct. In the particular case described here, the latter is also equipped, downstream of the filter, with a fan or other air circulating system 74. Finally, a radioactivity detection probe 76 is placed within pipe 28 downstream of outlet port 66 of duct 62. Probe 76 is connected by control means 78 to fan 74 and to flap 68.

The standby branch circuit functions as follows. If a leak occurs in can 58 and in the wall of tube 10 containing said can, the cooling air is contaminated and the radioactivity detected by probe 76. At this instant, by means of the control device 78, the probe controls the closing of flap 68 and the starting up of fan 74. Thus, the hot air extracted from room 11 does not pass directly through pipe 28 and instead passes through duct 62, where it is filtered by filter 72, which retains virtually all the radioactive duct. It is therefore clean air having no contamination which is discharged to the outside. Optionally, the control means 78 can also control an alarm, so that sealing checks for the storage tubes 10 and cans 58 are performed from handling area 40. Thus, room 11 is generally classified as a forbidden area for personnel and no inspection or control apparatus is located therein.

It is preferable for probe 76 to be positioned downstream of port 66 in pipe 28, because it thus makes it possible to check whether the air leaving the standby branch circuit is contaminated and therefore check the satisfactory operation of said circuit.

Thus, the apparatus according to the invention has particularly interesting advantages, because each tube is independently cooled by natural convection. It is therefore no longer necessary to have fans or other cooling air circulating means and the apparatus functions no matter what the dimensions of the storage room.

What is claimed is:

1. An apparatus for the dry storage of heat-emitting radioactive materials, comprising at least one tube within which said materials are stored, the arrangement of the materials stored in said tube being such that no material is located in the upper part of the tube, said tube having tube walls heating under the effect of the heat emitted by said materials and leading to the formation along said tube walls, by natural convection of a heat transfer fluid surrounding said tube, of a boundary layer of a heat transfer fluid of predetermined thickness measured in a direction laterally outwardly from said tube walls, said tube being disposed within a storage room bounded by a room wall and having at least one cold fluid inlet port near its lower part and a hot fluid outlet port near its upper part for enabling flow of said heat transfer fluid through said storage room, wherein the distance between said tube walls and said room wall or an adjacent tube is greater than said predetermined thickness so that said boundary layer is not in contact either with said room wall, or with a boundary layer of said adjacent tube, whereby the cooling of each tube is thus independently ensured.

2. An apparatus according to claim 1, wherein said storage room comprises a ceiling which is inclined and rises in the direction of said hot fluid outlet, in order to facilitate extraction of heated fluid from said hot fluid output port.

3. An apparatus according to claim 1, comprising a deflector located in the upper part of said storage room, said deflector being inclined and rising in the direction of the hot fluid outlet port in order to assist the extraction of heated fluid from said hot fluid outlet port.

4. An apparatus according to claim 1, wherein said hot fluid output port is connected to an extraction pipe equipped with a standby branch circuit.

5. An apparatus according to claim 4, wherein said standby branch circuit comprises:
a duct connected in parallel to said extraction pipe and communicating therewith by an inlet port and an outlet port,
a filter mounted on said duct, so as to filter fluid circulating in the latter, sealing means for sealing said extraction pipe between said inlet port and said outlet port, a radioactivity detector in said extraction pipe, and control means connecting said detector to said sealing means.

6. An apparatus according to claim 5, wherein said duct is equipped with an extractor fan mounted downstream of said filter.

7. An apparatus according to claim 6, wherein said extractor fan is connected to said radioactivity detector by a control means.

8. Apparatus for dry storage of radioactive heat-emitting material comprising:

a storage room defined by a wall and having fluid inlet port and fluid outlet port through which heat transfer fluid can enter and exit said storage room, respectively;

and at least one tube containing said heat-emitting material located within said storage room, the arrangement of the materials stored in said tube being such that no material is located in the upper part of the tube, said tube being heated by said material therewithin and effecting transfer of heat to heat transfer fluid within said storage room, said tube being disposed so as to effect, by natural convection, fluid flow from said fluid inlet port and around said tube to said fluid outlet port and formation of a rising boundary layer of heat transfer fluid around said tube, said boundary layer having a thickness measured in a direction extending laterally from a side of said tube, said tube being further disposed so that said boundary layer is not in contact with said wall or with a boundary layer of another tube in said storage room to thereby ensure independent cooling of said tube.

9. Apparatus according to claim 8 wherein said tube is vertically disposed, wherein said boundary layer increases from a minimum to a maximum thickness in a direction proceeding from the lower end toward the upper end of said tube, and wherein a tube is spaced from said wall by a distance at least as great as the maximum thickness of said boundary layer and is spaced from another tube for a distance at least as great as the sum of the maximum thickness of adjacent boundary layers.

10. Apparatus according to claim 9 wherein the temperature of a boundary layer is greatest in the region of maximum thickness.

11. Apparatus for dry storage of heat-emitting radioactive material comprising:

a storage room defined by a room wall and having at least one cold fluid inlet port near the lower part of said storage room through which a heat transfer fluid can enter said storage room at ambient temperature and having at least one hot fluid outlet port near the upper part of said storage room through which said heat transfer fluid at a temperature above said ambient temperature can exit said storage room;

and at least one tube containing said heat-emitting radioactive material located within said storage room, the arrangement of the materials stored in said tube being such that no material is located in the upper part of the tube, said tube being vertically disposed and having a lower end located near said cold fluid inlet port and an upper end located near said hot fluid outlet port, said tube having a tube wall which is heated by said heat-emitting radioactive material therewithin and effects heating of said heat transfer fluid within said storage room so as to effect, by natural convection, flow of said heat transfer fluid from said cold fluid inlet port through said storage room to said hot fluid outlet port and formation of a rising boundary layer of heat transfer fluid around said tube wall which is heated by said tube wall, said boundary layer having a thickness measured in a direction extending laterally from a side of said tube wall which increases from a minimum thickness to a maximum thickness proceeding in a direction from the lower end toward the upper end of said tube, said boundary layer having a temperature which increases proceeding in the direction from minimum to maximum thickness, said tube being disposed so that it is spaced from said room wall by a distance equal to or greater than said maximum thickness of said boundary layer to thereby ensure cooling of said tube solely by heat transfer fluid as it enters said cold fluid inlet port.

12. Apparatus according to claim 11 including a plurality of said tubes, wherein each tube is disposed so that it is spaced from said room wall by a distance equal to or greater than said maximum thickness, and wherein each tube is disposed so that it is spaced from an adjacent tube by a distance equal to or greater than the sum of the maximum thicknesses of the boundary layers of two adjacent tubes, to thereby ensure independent cooling of each tube solely by heat transfer fluid entering said cold fluid inlet port and before said heat transfer fluid contacts another tube.

* * * * *